April 26, 1938. P. DUPUY ET AL 2,115,159

SUSPENSION FOR VEHICLES

Original Filed July 6, 1934  2 Sheets-Sheet 1

INVENTORS
PIERRE DUPUY
JEAN MERCIER
BY
Paul R Ames
ATTORNEY

April 26, 1938.   P. DUPUY ET AL   2,115,159
SUSPENSION FOR VEHICLES
Original Filed July 6, 1934   2 Sheets-Sheet 2

INVENTORS
PIERRE DUPUY
JEAN MERCIER
BY
Paul R. Ames
ATTORNEY

Patented Apr. 26, 1938

2,115,159

UNITED STATES PATENT OFFICE 2,115,159

SUSPENSION FOR VEHICLES

Pierre Dupuy and Jean Mercier, Paris, France

Application July 6, 1934, Serial No. 733,954. Renewed February 28, 1938. In France June 19, 1931

24 Claims. (Cl. 267—11)

This invention relates to shock-absorbing devices for automobiles and other vehicles and more particularly to pneumatic shock-absorbing and suspension devices which will dampen rolling action due to uneven shocks upon the wheels of the vehicle.

It is an object of the invention to provide means for increasing the flexibility of the pneumatic suspension device when wheels at opposite sides of the vehicle move toward or away from the vehicle at the same time, or when the axle moves vertically and parallel to its original position, and to decrease the flexibility or increase the resistance of the shock absorbing device when only one wheel moves toward or from the vehicle, or when the axle oscillates angularly about its middle portion.

It is also an object of the invention to provide a pneumatic suspension and shock-absorbing device with means for selectively controlling the vertical and angular movement of the vehicle relative to the wheels, and to provide automatic means for regulating the forces opposing such motion.

The pneumatic suspension and shock-absorbing devices may be in the form of closed cylinders filled with compressible gas attached to the vehicle body having pistons attached to the axles or other wheel supporting means, or they may comprise deformable gas filled containers which change shape with the displacements of the non-suspended parts of the vehicle relative to the suspended parts. When such deformable containers are used, the suspension is controlled in such a manner that the areas of the container in contact with the suspended parts or with the parts not suspended, or with each of said parts, vary with the relative position of the suspended and non-suspended parts in such a manner as to obtain any desired variation in flexibility, as described in our copending application 611,364 filed May 14, 1932 of which the present application is a continuation in part.

In describing the invention, reference will be made to its use in conjunction with a vehicle having an axle which may move toward and away from the vehicle as a unit, which motion may be called rectilinear motion, and which may oscillate angularly with respect to the vehicle, which motion may be called angular oscillations. The invention is not, however, confined to a vehicle supported in this manner, since it may also be used with vehicles in which each wheel is supported separately and without having axles connecting them.

The improved results indicated may be obtained by floating the wheel supports on opposite sides of the vehicle between gas containers so inter-connected by small tubes that flexibility is increased upon rectilinear motion of the wheels, while flexibility is decreased during angular oscillation and at the same time any rolling motion is effectively dampened. The degree of flexibility of the suspension and the anti-rolling action may be controlled either manually or by automatic devices actuated by the centrifugal force of the vehicle or by its lateral displacement.

In the drawings, Figure 1 is a diagrammatic view illustrating the general arrangement of the cushioning device using deformable containers.

Figure 2 is a diagrammatic view illustrating the means for controlling the flexibility of the suspension and the anti-rolling action by means of a four-way valve which may be operated manually or mechanically. Figure 3 is a sectional elevation of a type of four-way valve such as shown in Figure 2. Figure 4 is a diagrammatic illustration of means for operating the four-way valve from a remote location.

Figures 7 and 8 are diagrammatic illustrations of a device arranged for controlling the suspension automatically by means of an electrically operated valve, and Figures 9 and 10 are diagrammatic views of means whereby such a valve as shown in Figure 7 can be operated by motion of the steering wheel.

Figure 11 illustrates an arrangement of a valve similar to that shown in Figure 7 with cylinder and piston shock absorbing devices.

Figure 1:
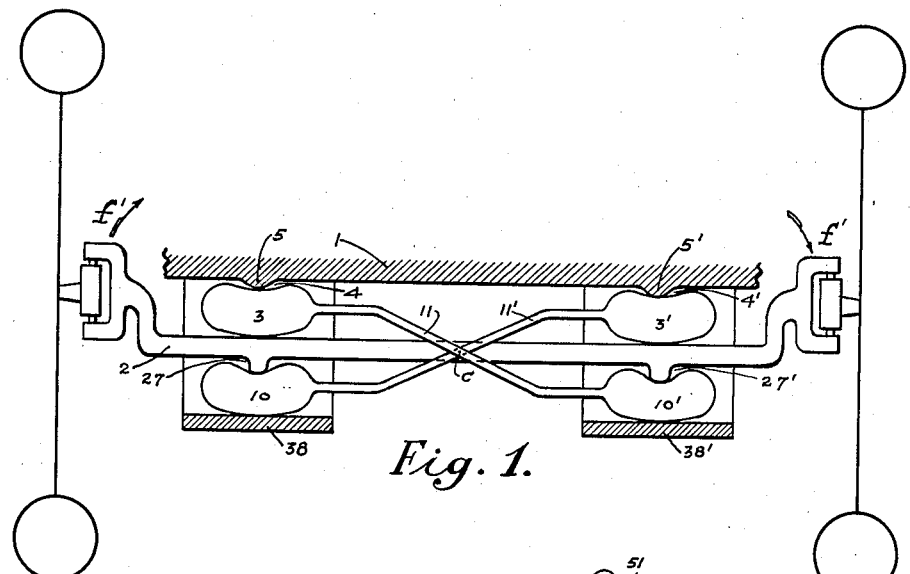

In the drawings the valves have been shown as enlarged, in comparison to the size of the suspension devices, in order to illustrate them more clearly.

In Figure 1 the numeral 1 designates a portion of the chassis at a location adjacent a pair of wheels of the vehicle. There are positioned between the portions of the chassis adjacent to each wheel and the opposite portions of the axle 2, deformable containers 3 and 3', which are preferably of hollow rubber or other flexible material adapted to contain a gas under pressure. The chassis may be provided with bosses 4 and 4' joined to the underneath portions of the chassis at 5 and 5', which bosses rest upon the deformable containers 3 and 3'. The deformable containers 10 and 10' are supported by members 38 and 38' which are part of the chassis 1. The axle 2 may be provided with bosses 27 and 27' of any suitable shape, to give the desired variation in resistance to deformation. The two containers 3 and 3' are connected by small non-deformable tubes 11 and 11' to the deformable containers 10' and 10.

With this arrangement any movement due to a vertical displacement of the axle toward the chassis will cause the containers 3 and 3' to be compressed and to discharge respectively into the containers 10' and 10. Since the same movement will expand the containers 10 and 10', the increase in volume of 10' and 10 will compensate for the decrease in volume of the containers 3 and 3'. The resistance in such a case is due to the resistance to passage of the gas through the small tubes 11 and 11' and to variations in the shapes of the bosses 4, 4' and 27, 27'. In the event of a rolling motion of the chassis, the movement of the axle relative to the chassis will be a rotation about a center C. If the movement is in the direction of the arrows f', the containers 3 and 10' will be compressed and will so decrease in volume while the containers 3' and 10 will increase in volume and the rolling of the vehicle will be resisted. The reactions are produced very rapidly with the variations of pressure and of area on which the pressure acts, so that the rolling is limited to a minimum amount. During compression of any of the containers, the contacting surface is such as provided by the bosses to cause an increase in the contacting area with increased displacement.

Figure 2:
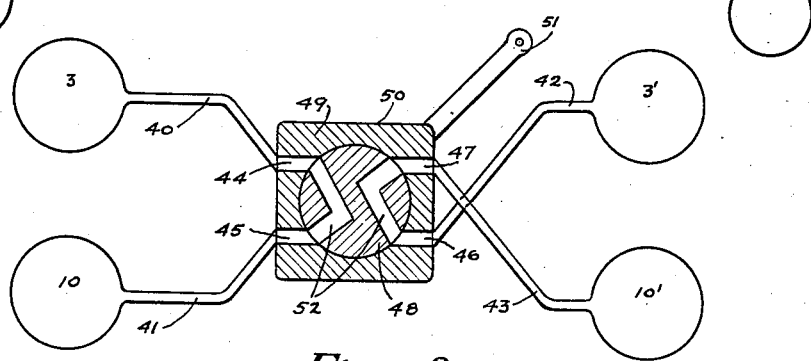

Figure 2 illustrates a four-way valve by which the communication of the containers with each other may be varied. In this figure, 50 is a four-way valve with a body 49, having passageways 44, 45, 46 and 47, and a plug 48 having passageways 52. A lever or handle 51 is connected to the plug 48 to rotate it within the body 49. The passageways 44, 45, 46 and 47 connect respectively with tubes 40, 41, 42, and 43. Tube 40 is in communication with container 3, tube 41 with container 10, tube 42 with container 3', and tube 43 with container 10'. When the plug 48 is in the position shown in Figure 2, containers 3 and 10 on one side of the vehicle are put in communication and containers 3' and 10' on the other side of the vehicle are put into communication. By making a quarter turn of the handle 51 in either direction, thus rotating the plug 48, containers 3 and 10' are put into communication on the one hand and containers 3' and 10 on the other. By making a one-eighth turn of the handle 51, the passageways 44, 45, 46 and 47 are closed to make each container act by itself.

When the vehicle is on a straight road and rolling is not feared, the four-way valve 50 may be actuated to put into communication the containers 3 and 10 on the one side and 3' and 10' on the other. When the road is such as to cause rolling, the valve 50 may be actuated to put into communication the containers 3 and 10' on the one hand and 3' and 10 on the other. When resistance to displacement of the axle relative to the chassis is desired, the valve 50 may be actuated to cause all of the containers to act independently of each other, as hereinbefore described.

Figures 3, 4:
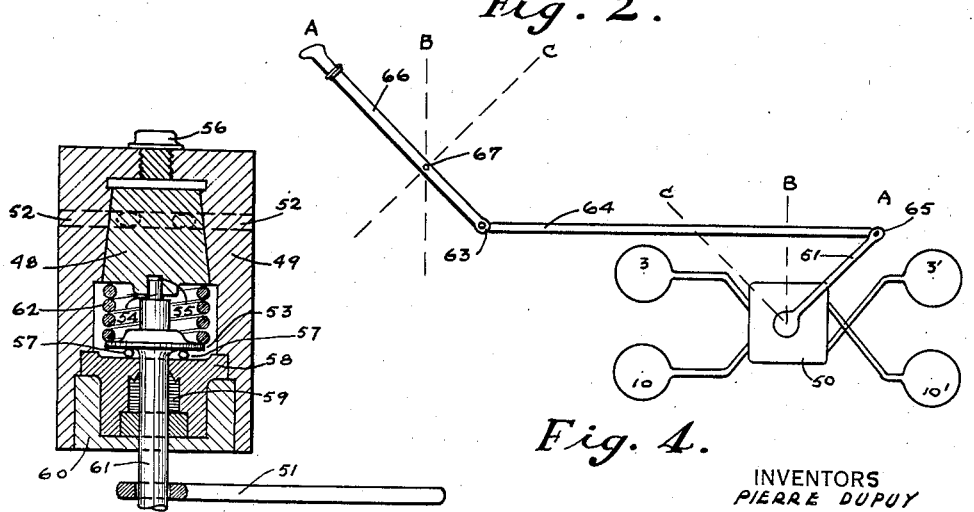

As illustrated in Figure 3, the handle or lever 51 is attached to the valve stem 61 and the plate 53 serves as a bearing surface for supporting and compressing the spring 62, which latter holds the plug 48 in position in the body. A key 54 attached to the end of the stem 61 engages the slot 55 and a threaded closure plug 56 closes the body 49. A roller bearing is illustrated at 57, and 58 is a holding member forming the lower bearing surface for the bearings 57. This member 58 contains a packing or sealing material 59. The numeral 60 designates a combined packing gland and holding member.

Figure 4 illustrates means for controlling the suspension from a remote location in the vehicle; 66 is an operating lever, pivoted at 67 to the chassis, which may be manually or mechanically operated and which is pivotally connected at 63 with the operating rod 64 pivotally connected at 65 with the valve lever 51. When the operating lever 66 is in the position A, containers 3 and 10 may be in communication on the one hand and containers 3' and 10' on the other. When the operating lever 66 is in position B, all of the containers will be out of communication with each other, and when lever 66 is in position C, the containers 3 and 10' will be in communication on the one hand and containers 3' and 10 on the other. In this way, the operator of the vehicle has complete control of the suspension. Other methods of effecting remote control, such as a flexible wire within a tube, may also be used, and the invention is not limited to the particular apparatus described.

Figure 5:
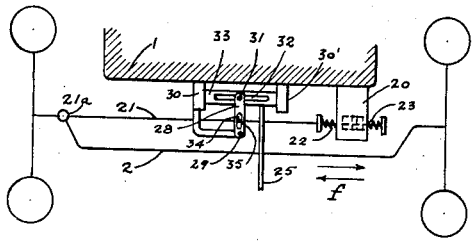
Figure 5 illustrates a device for mechanically operating such a valve by displacement of the body of the vehicle, relative to the wheel supports.
Figure 6:
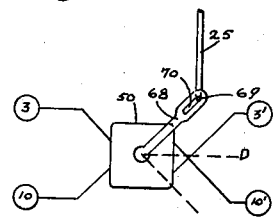
Figure 6 illustrates the valve to be operated thereby, which valve is shown as very much enlarged in comparison with Figure 5.

The action of centrifugal force or lateral force on the chassis and the body may also be transmitted to the suspension by a mechanical part which may be used to automatically control the four-way valve 50, or other device for controlling the flow of the compressed gas in the connecting pipes 40, 41, 42 and 43. Such an arrangement is illustrated in Figures 5 and 6 wherein a rod 21 is carried by the body 1. This rod 21 can slide in the guide 20 attached to the body 1 of the vehicle. Two springs 22 and 23 maintain the rod 21 in the middle portion under normal conditions. The other end of the rod 21 is joined at 21a to the axle 2. It is apparent that every displacement of the axle 2 relative to the body 1 in the direction of the arrows f will bring about a displacement of the rod 21 relative to the body 1 and at the same time cause compression of the spring 22 or the spring 23, depending upon which direction the displacement takes place. The movement of this rod 21 and the considerable force which it puts into play can control the valve 50 or other similar part directly. For example, the lever 28 may be pivoted at 29 to the bracket 30 depending from the chassis 1. The upper end of the lever 28 may carry a pin or roller 31 adapted to slide or roll in the slot 32 in the slide block 33 adapted to slide up and down between the bracket 30 and the bracket 30' also fixed to the chassis 1. The lever 28 is provided with a slot 34 in which a pin or roller 35 carried by the rod 21 may slide or roll. When the rod 21 moves laterally relative to the chassis 1, in either direction, the lever 28 will swing about the pivot 29 and draw the block 33 downwardly so that the rod 25, connected with the valve handle 68 by means of a pin 69 through the slot 70, and actuated by the block 33, will turn the valve handle 68. When the displacement is of a comparatively great magnitude the handle 68 will be in position E and the containers 3 and 10' will be put into communication on the one hand and the containers 3' and 10 on the other, but when the displacement is of lesser magnitude, the handle 68 will be in position D and all of the containers will be sealed one from the other, thus automatically and effectively controlling the suspension device. Other means may, of course, be used for accomplishing this mechanical actuation of the valve 50. If desired, to obtain a greater throw of the block 33 the slot 32 may be curved or slanted upwardly on each side of the center of the slot.

In Figure 7 an example of an arrangement for controlling the suspension automatically by electric means has been shown. In this figure 71 is an electromagnetically operated four-way slide valve in which 72 is the valve body having ports 73, 74, 75 and 76 and 77 is a sliding member containing passageways 78, 78 and 79, 79. The numeral 80 designates an electromagnetic coil, and 81 is a spring joined to the body 72 at 82 and to the slide 77 at 83.

For controlling the valve, a tube 12, of glass or other suitable non-conducting material and convex on its lower surface, containing a drop of mercury 13, or other suitable electrically conductive material, is carried on the vehicle. This drop of mercury is of sufficient size to connect electrodes 14—a and 15—a or electrodes 14—b and 15—b, when centrifugal force or the lateral movement of the car propels the drop of mercury toward either end of the tube a sufficient distance. Electrodes 14—a and 14—b are connected directly to one of the terminals of a convenient source of electricity, such as the battery 16 and the electrodes 15—a and 15—b are connected to the other terminal of the battery in series with the electromagnetic coil 80.

When the mercury is in its normal position in the center of the tube, the electric circuit is broken and the tension of the spring 81 holds the slide 77 so that the openings 73, 74, 75 and 76 are in juxtaposition with passageways 78, 78, and the containers 3 and 10 are in communication on the one hand and containers 3' and 10' on the other. When the centrifugal force or lateral movement of the vehicle propels the drop of mercury toward either end of the tube a sufficient distance, the circuit is closed and the electro-magnet 80 is energized and, in opposition to the force of the spring 81, moves the slide 77 so that the passageways 79, 79 are in juxtaposition with the openings 73, 74, 75, and 76, thus putting the containers 3 and 10' into communication on the one hand and containers 3' and 10 on the other. When the circuit is broken by the return of the mercury to the center of the tube, the spring returns the slide to its former position.

In order to prevent inopportune movements of the mercury, the tube 12 may be filled with any non-conducting liquid, for example with an oil of suitable viscosity. In Figure 8 the control of the tube 12 may be modified in such a way that the valve 71, having a different slider 77a with passageways 78a, 78a and 79a, 79a, will ordinarily be held by the action of the electromagnet so that the openings 73, 74, 75 and 76 will be in juxtaposition with the passageways 78a. The tube 12 has electrodes 14 and 15 in the central portion so that the circuit is closed and the electromagnet 80 is energized when the vehicle is in a normal position. When the centrifugal force or lateral movement of the vehicle propels the drop of mercury toward either end, the circuit is broken and the passageways 79a are brought into juxtaposition with the ports 73, 74, 75 and 76 by the action of spring 81. When the vehicle returns to its normal position, the electro-magnet is again energized and pulls the passageways 78a into juxtaposition with the ports 73, 74, 75 and 76, in opposition to the force exerted by spring 81.

With the arrangement shown in Figures 7 and 8, a single tube 12 may be used to control the suspensions provided and operated in connection with each of the pairs of wheels of a vehicle by a suitable arrangement of wiring.

It is apparent that other arrangements of the electro-magnet and the passageways and outlets to the valve may be made to give other desired cooperations between the containers. For example, the passageways 78 and 79 or the passageways 78a and 79a might be reversed to alter the normal cooperation between the containers or the slides 77 and 77a might be provided with passageways connecting the containers 3 and 3' and the containers 10 and 10', in addition to or in place of any of the passageways 78, 79, 78a or 79a.

Also, other devices may be used to control the electro-magnetically operated valve 71. For example, a switch may be placed in the circuit in place of the tube 12, and located for convenient operation by the driver of the vehicle, or a freely swinging pendulum having contacts and operated by centrifugal force or lateral movement of the body may be utilized for opening and closing the electric circuit.

Figures 9 and 10 show means for controlling the valve 71 by the action of the steering mechanism, where it is desired to secure an anti-rolling effect only on the turns. In these figures, 87 designates a steering wheel of ordinary construction. 88 is the steering wheel shaft, surrounded by a casing 89. 90 is a disc or ring of non-conducting material, joined rigidly to the casing 89 and having mounted thereon, or set therein, a discontinuous ring 91 of electrically conductive material connected to one terminal of the battery 16 by the wire 84. The electrically conductive brush or contact 92 is rigidly joined to shaft 88 and adapted to contact the disc 90 or the ring 91 depending upon the relative position of shaft 88 and casing 89. The wire 85 from the brush 92 is connected in series through the coil 80 with the other terminal of the battery 16 as illustrated in Figures 7 and 11.

When the steering wheel is held in the position so that the wheels of the vehicle are straight, no current flows through the coil 80 and the ports 73, 74, 75 and 76 are in juxtaposition with the passageways 78 of the slider 77. When the steering wheel is turned, however, the brush 92 contacts the ring 91, thereby closing the circuit and causing the ports to be in juxtaposition with passageways 79.

If desired, the fixed conductor 91, illustrated in Figure 10, may be positioned in the non-conductor 90 so that the brush 92 normally contacts with the conductor 91 and so that upon movement of the steering wheel the contact will be broken; thus providing an electrical contact operating similarly to that illustrated in Figure 8.

In the arrangement illustrated in Figure 11 the shock absorbers are of the type described in the Mercier Patent 1,914,814 of June 20, 1933, in which the cylinders 93 and 93' are carried by the body of the vehicle and the pistons 94 and 94' are actuated by the movement of the wheels or axle relative to the body through the connecting rods 95 and 95'. With this arrangement the valve 71 may be connected by pipes 40a, 41a, 42a and 43a to the portions of the cylinders 93 and 93' on opposite sides of the pistons 94 and 94'.

It is evident that a valve similar to 71 and without the coil 80 may be operated mechanically or manually by devices similar to those heretofore shown in conjunction with valve 50. Also, the valve 50 may be operated by an electric circuit and an electromagnet in a manner similar to that described in connection with valve 71.

The invention is by no means limited to the ways which have been represented and described and which have been chosen as examples only. Other adaptations may be used; for example, the deformable containers between which the moving portions of the vehicle are floated may be replaced by cylinders and pistons providing pneumatic cushions of variable volumes. Also, the invention may be applied to vehicles without an axle in which the axle is replaced by a movable member attached to the wheel, which member in turn rests between the containers. It is apparent that the suspension and anti-rolling device described herein may be applied to each of the pairs of wheels of a vehicle or to a single pair of wheels.

The terms used in describing the invention are used as terms of description and not as terms of limitation, and it is intended that all equivalents of these terms be included within the scope of the invention claimed.

What we claim is:

1. An anti-rolling and suspension device for vehicles in which the wheel supports on opposite sides of the vehicle are positioned between deformable gas containers, and pipes connecting the gas containers beneath the wheel supports to the gas containers above the wheel supports on the opposite sides, at least one of said containers contacting a surface shaped to rapidly increase its area in contact with the container upon displacement of the adjacent support towards said container.

2. An anti-rolling and suspension device for vehicles in which the wheel supports on opposite sides of the vehicle are suspended from the body of said vehicle between pneumatic containers, said containers having pipes leading therefrom, and all of said pipes having communication with a four-way valve, and means for automatically operating said four-way valve by lateral movement of said body relative to said wheel supports.

3. An anti-rolling and suspension device for vehicles in which the wheel supports on opposite sides of the vehicle are suspended from the body of said vehicle between pneumatic containers, said containers having pipes leading therefrom, and all of said pipes having communication with a four-way valve, and means for automatically operating said four-way valve by the action of centrifugal force.

4. An anti-rolling and suspension device for vehicles in which the wheel supports on opposite sides of the vehicle are suspended from the body of said vehicle between pneumatic containers, said containers having pipes leading therefrom, and all of said pipes having communication with a four-way valve, and electro-magnetic means for operating said valve.

5. An anti-rolling and suspension device for vehicles in which the wheel supports on opposite sides of the vehicle are suspended from the body of said vehicle between pneumatic containers, said containers having pipes leading therefrom, and all of said pipes having communication with a four-way valve, electro-magnetic means for operating said valve, and means for controlling said electromagnetic means automatically by displacement through movement of the vehicle.

6. An anti-rolling and suspension device for vehicles in which the wheel supports on opposite sides of the vehicle are suspended from the body of said vehicle between pneumatic containers, said containers having pipes leading therefrom, and all of said pipes having communications with a four-way valve, electro-magnetic means for operating said valve, and means for controlling said electromagnetic means by movements of the steering mechanism of the vehicle.

7. An anti-rolling and suspension device in which the wheel supports on opposite sides of the vehicle are suspended between pneumatic containers, means for connecting the upper and lower containers on the same sides, and means for alternatively connecting the lower containers with the upper containers on opposite and the same sides.

8. An anti-rolling and suspension device in which the wheel supports on opposite sides of the vehicle are suspended between pneumatic containers, means for connecting the upper and lower containers on the same sides, means for alternatively connecting the lower containers with the upper containers on the opposite and the same sides, and means for disconnecting each of said containers from each other.

9. An anti-rolling and suspension device in which the wheel supports on opposite sides of the vehicle are positioned between deformable gas containers, means for connecting the containers beneath the wheel supports with the containers above the wheel supports on the same sides, and means for alternatively connecting the containers beneath the wheel supports with the containers above the wheel supports on the opposite and the same sides.

10. An anti-rolling and suspension device in which the wheel supports on opposite sides of the vehicle are positioned between deformable gas containers, means for connecting the containers beneath the wheel supports with the containers above the wheel supports on the same sides, means for alternatively connecting the containers beneath the wheel supports with the containers above the wheel supports on the opposite and the same sides, and means for disconnecting each of said containers from each other.

11. An anti-rolling and suspension device for vehicles comprising deformable gas containers positioned above and below the wheel supports on opposite sides of the vehicle, connecting pipes leading from said containers and communicating with a valve, and means for automatically operating said valve to vary the communication between said containers.

12. An anti-rolling and suspension device for vehicles, comprising deformable gas containers positioned above and below the wheel supports on opposite sides of the vehicle, and at least one of said containers having a small portion of its area in contact with a rigid convex projecting surface when the vehicle is in the normal position in relation to the wheel supports and having a larger portion of its area in contact with said projecting surface and with a surface adjacent to said projecting surface when the container is displaced toward said projecting surface.

13. An anti-rolling and suspension device for vehicles, comprising deformable gas containers positioned above and below the wheel supports on opposite sides of the vehicle, and each of said containers having a small portion of its area in contact with a rigid convex projecting surface when the vehicle is in the normal position in relation to the wheel supports and having a larger portion of its area in contact with said projecting surface and with a surface adjacent to said projecting surface, when the container is displaced toward said projecting surface.

14. A suspension device for vehicles comprising gas containers of variable capacity on one side of the vehicle connected by tubes with gas containers of variable capacity on the opposite side of the vehicle, said tubes having a common valve adapted to vary the communication between the several capacities.

15. An anti-rolling device for vehicles comprising pneumatic containers in which a fluid is compressed by relative movement between the wheel supports and the body of the vehicle, said containers having pipes leading therefrom and each of said pipes having independent communication with a common valve.

16. An anti-rolling device for vehicles comprising a plurality of pneumatic containers in which the fluid is compressed by relative movement between the wheel supports and the body of the vehicle, closed conduits leading from each of said containers to a valve adapted to alter the communication of said containers with each other.

17. A device as defined in claim 16 in which the valve is adapted to put into communication with each other containers in which the fluid is compressed by movement of the wheel support relative to the body of the vehicle.

18. A device as defined in claim 16 in which the container in which the compressed fluid tends to force the body toward the support on one side of the vehicle is connected through the valve to the container in which the compressed fluid tends to force the body away from the support on the other side of the vehicle.

19. A device as defined in claim 16 in which the valve is constructed and arranged to put into communication, in one position, a container in which the fluid is compressed by movement of the body toward the support on one side of the vehicle with a container in which the fluid is compressed by the movement of the body away from the support on the other side of the vehicle and, in another position, to put into communication a container in which the fluid is compressed by movement of the vehicle toward the support with a container in which the fluid is expanded by movement of the vehicle toward the support.

20. A device as defined in claim 16 in which the valve is actuated by the movement of the body relative to the support.

21. A device as defined in claim 16 in which the valve is actuated by an electromagnet.

22. A device as defined in claim 16 in which the valve is actuated by movement of the steering wheel.

23. A suspension device for vehicles in which the wheel supports on opposite sides of the vehicle are positioned between deformable gas containers, and pipes connecting pairs of said gas containers together, at least one container of each pair being in contact with surfaces shaped to rapidly increase the areas of contact upon displacement of the adjacent support toward each said container.

24. An anti-rolling and suspension device for vehicles in which the wheel supports on opposite sides of the vehicle are suspended from the body of said vehicle between pneumatic containers, the lower containers being connected to the upper containers on the opposite sides by pipes sufficiently small to restrict the rapid flow of a fluid therethrough, and at least one container of each pair being in contact with surfaces shaped to rapidly increase the areas of contact upon displacement of the adjacent support toward each said container and nearer the end of said displacement.

PIERRE DUPUY.
JEAN MERCIER.